(12) United States Patent
Bilanin et al.

(10) Patent No.: US 6,835,679 B2
(45) Date of Patent: Dec. 28, 2004

(54) LOSSY FIBER UV CURING METHOD AND APPARATUS

(75) Inventors: Alan J. Bilanin, Princeton, NJ (US); Andrew E. Kaufman, West Windsor, NJ (US); Robert McCullough, Sausalito, CA (US)

(73) Assignee: Continuum Dynamics, Inc., Ewing, NJ (US)

( * ) Notice: Subject to any disclaimer, the term of this patent is extended or adjusted under 35 U.S.C. 154(b) by 47 days.

(21) Appl. No.: 10/331,002

(22) Filed: Dec. 26, 2002

(65) Prior Publication Data

US 2004/0021255 A1 Feb. 5, 2004

Related U.S. Application Data

(60) Provisional application No. 60/342,394, filed on Dec. 27, 2001.

(51) Int. Cl.[7] ........................ B01J 19/12; B32B 27/02; G02B 6/02; G02B 6/04; C08J 3/28
(52) U.S. Cl. ........................ 442/186.3; 250/493.1; 250/503.1; 250/504 R; 428/297.4; 428/298.7; 428/300.1; 428/378; 522/1; 522/2; 385/100; 385/115; 385/123
(58) Field of Search ................. 422/186.3; 250/493.1, 250/503.1, 504 R, 504 H; 428/297.4, 298.7, 300.1, 378, 299.1, 299.4, 299.7, 300.4, 301.4, 375; 385/100, 115, 123; 522/1, 2, 170, 107, 96, 103, 182, 183

(56) References Cited

U.S. PATENT DOCUMENTS

| | | | | |
|---|---|---|---|---|
| 4,936,649 A | * | 6/1990 | Lymer et al. | 385/13 |
| 5,221,387 A | | 6/1993 | Robbins et al. | |
| 5,502,903 A | | 4/1996 | Barker | |
| 5,729,641 A | * | 3/1998 | Chandonnet et al. | 385/2 |
| 6,108,476 A | * | 8/2000 | Iimura | 385/128 |
| 6,200,134 B1 | | 3/2001 | Kovac et al. | |
| 6,238,630 B1 | * | 5/2001 | Iimura | 422/186.3 |
| 6,350,792 B1 | * | 2/2002 | Smetana et al. | 522/81 |
| 6,435,872 B1 | | 8/2002 | Nagel | |
| 6,685,889 B1 | * | 2/2004 | Raftery et al. | 422/186.3 |

OTHER PUBLICATIONS

"Photoinitiators for UV Curing" A formulators GuidE; Ciba Geigy, Oct. 1997.
"Cyracucure Cycloaliphatic Epoxidesy: Cationic UV Cure", Document UC–958A, Union Carbide Corp. 1997.
"Structure & Properties of Composites" Materials Science & Technology vol. 13, pp 34–37, 1993; Chou T.W.
"Resin Selections & High–Speed Coating of Optical Fibers with UV Curable Materials"; Toshinao Kokubun, Yutaka Katsuyama Kaxuo Hogari and Satomi Hatano; Journal of Lightwave Technology, vol. 7, No. 5, pp 824–828, May 1989.
The Composite Materials Handbook—MIL 17; vol. 3; Materials, Usage, Design and Anaalysis; Technomic Publishing Company, Inc. pp 2–7 to 2–26.

* cited by examiner

Primary Examiner—Susan Berman
(74) Attorney, Agent, or Firm—Synnestvedt Lechner & Woodbridge, LLP; Richard C. Woodbridge, Esq; Roy J. Rosser (57) ABSTRACT

A method and apparatus for light curing of composite materials in which the radiation required to initiate the curing is delivered via one or more lossy fiber optics. The fiber optics are made lossy by methods such as bending the fiber, weaving the fiber into a mat to create periodic microbends, tailoring the thickness of the fiber cladding to allow evanescent wave transmission, or simply removing the cladding at intervals along the fiber. Distribution of the light through out the composite material results in dramatic power and time reductions over traditional light curing methods. Unlike thermal curing of composite materials, there is no need for an auto-clave and hence no limit on the size of the part that may be created. Additional benefits include the possibility of curing at operational temperature and so avoiding thermal stresses.

29 Claims, 5 Drawing Sheets

LOSSY FIBER UV CURING METHOD AND APPARATUS

RELATED APPLICATIONS

This application is related to and claims the benefit and filing date of U.S. provisional application No. 60/342,394, entitled "Novel UV Curing Composite Fabrication Method", filed on Dec. 27, 2001, which is hereby incorporated by reference.

FIELD OF THE INVENTION

The present invention relates to methods and apparatus for using optical fibers in curing, and particularly to the use of lossy fiber optics for optical and UV curing of resins and composite structures.

BACKGROUND OF THE INVENTION

Composite materials consisting of fibers in a matrix of thermosetting polymer are well known and widely used in a variety of applications and industries, including the aircraft, automotive, spacecraft and marine industries. Typical fibers used in such composite materials include glass, carbon and polymer fibers, such as Kevlar. Typical matrix materials include polymers such as polyester or epoxy.

Traditionally the composite material in its raw state is pliable and readily manipulated to form a desired shape. Once in the desired shape, the material is cured, causing it to become rigid and maintain the desired shape even after removal of any molds or forms used to initially fashion the material into the desired shape. The curing may additionally cause bounding of the composite material to adjacent material.

Curing of the matrix of the composite material is caused by the addition of an energy source, which initiates a catalytic reaction. Energy sources include heat, light, and energetic electrons.

The most commonly used energy source for curing composite materials is heat. Thermally curing the resin has the advantage that high fiber fractions can be obtained, which provides high strength and low weight. However, thermoset resins have high tooling and manufacturing costs. The autoclaves necessary for curing thermosetting composites are expensive to purchase and operate. Tooling, such as the part molds, must be designed for these high temperatures and adequately compensate for a variety of thermal expansion issues. The high curing temperatures also lead to high residual stresses, which can be a particular problem for low temperature applications and composite/metal bonds. Part size is limited by the size of the autoclave and the cure time is very long (typically 10 hours or more).

Using energetic electrons is another established way to provide the energy necessary to cure composites. Electron beam (EB) curing minimizes the tooling costs, cure time, and residual stresses (if the parts are cured at their operating temperature), but typically sacrifices part performance when compared to traditional thermoset structures. Because an autoclave is not required, part size is not limited. However, EB curing may not provide uniform cures because the beam must be passed over the surface in a prescribed pattern. Lower fiber fractions are used with EB curing to allow electron penetration. Charge buildup within thick structures can also pose problems.

Light, particularly blue and Ultra-Violet (UV) wavelength light, is a third method of providing the energy for curing composite materials. Traditional light curing processes have similar advantages to EB curing relative to thermal curing. There are no size restrictions (no autoclave is required), tooling and manufacturing costs are reduced, cure time is greatly reduced, and curing can be performed over a wide temperature range.

Light curing of resins has been used extensively in situations where rapid curing is essential, such as dentistry, as exemplified by U.S. Pat. No. 6,435,872 to Nagel entitled "Tapered light probe with non-circular output for a dental light curing unit", the contents of which are hereby incorporated by reference, and U.S. Pat. No. 6,200,134 to Kovac et al. entitled "Apparatus and method for curing materials with radiation", the contents of which are hereby incorporated by reference. The systems described by Nagel and by Kovac et al are both conventional in that the light is transmitted along the fiber and exits from the fiber end external to the curing resin.

However, traditional blue light or UV curing has significant drawbacks. It is limited to thin layups with transparent fibers, e.g., no carbon fiber. Layups also have lower fiber fraction to allow light or UV penetration, which also minimizes performance. Traditional UV curing using external illumination cannot cure thick sections, except by curing multiple thin layups.

The main difficulty with light curing of composite materials has been supplying the energy source from outside the matrix to the interior in a uniform manner with sufficient flux to affect a cure in a short time.

The light curing method and apparatus of this invention overcomes these disadvantages while maintaining all of the advantages of light curing by delivering the light to the photocurable resin in a composite material in a unique way—by means of one or more lossy optical fibers embedded in, or in close proximity to, the light-curable resin.

Although lossy optical fibers have been used for illumination and decoration as described in, for instance, by Baker in U.S. Pat. No. 5,502,903, entitled "Footwear with illuminated linear optics", the contents of which are hereby incorporated by reference, the linear optics described previously are largely limited to having relatively thick (of the order of 0.165 inch diameter) polymer cores with thin air gaps formed by heat shrinking material over the core, as described for instance by Robbins et al. in U.S. Pat. No. 5,221,387 entitled "Methods of manufacture of improved linear optical conduits", the contents of which are hereby incorporated by reference. The previously described materials and methods used to make the fibers lossy are not generally suitable for use throughout the optical spectrum and are particularly unsuitable for short wavelength radiation, including UV radiation.

SUMMARY OF THE INVENTION

The invention of this application is a light curing method and apparatus that utilizes one or more lossy optical fibers to deliver light to a curable matrix material. In particular, this invention is a method and apparatus in which the light delivered to the curable resin is the light leaked out of the light transmitting and leaking fiber.

Light curable resins are often activated only or more efficiently by shorter wavelengths of light, such as, but not limited to those wavelengths conventionally described as either blue or UV light and much of the description of the invention is in terms specific to blue or UV light. However, one of skill in the art will readily appreciate that the invention is operable with any wavelength of electromagnetic radiation for which there is both a radiation curable resin and fibers capable of transmitting and leaking that wavelength of electromagnetic radiation.

In one embodiment of the invention, an array of lossy optical fibers is interleaved with structural fibers in the composite. Because the light source is effectively embedded in the structure, the resin is cured uniformly, regardless of the reinforcing fiber properties, structure size, shape, or thickness.

The light transmitting and leaking fibers may be made lossy for the purposes of this invention by means such as, but not limited to, having a cladding sufficiently thin to allow leakage by evanescent wave or by bends in the fiber, including micro-bends introduced by weaving the fiber.

In another embodiment of the invention, the light transmitting and leaking fibers may also form part of the structure.

The method of this invention provides several advantages over existing methods of curing composite materials including, but not limited to, faster curing times, the ability to include materials with limited light transmission, no size limits imposed by the need for an autoclave, the ability to cure materials at their operational temperature and so minimize thermal stresses, and no thickness limitations on the composite material.

As photo-curing materials tend to work better with shorter wavelength light, in another embodiment of this invention, the lossy fibers are made capable of transmitting and leaking short wavelength radiation such as blue light or Ultra-Violet (UV) radiation.

DETAILED DESCRIPTION OF THE INVENTION

Figure 1:
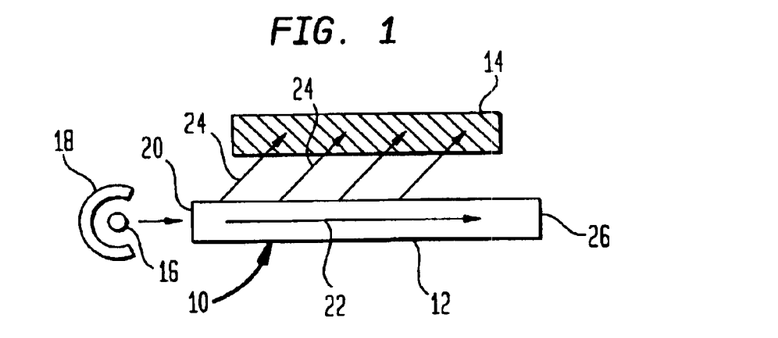
FIG. 1 is a schematic cross section of the apparatus of this invention.

FIG. 1 is a schematic cross section of a simple embodiment of an optical curing apparatus 10 of this invention, in which one or more light-transmitting, lossy fibers 12 are placed in proximity to a light-curing material or resin 14.

Typical light-curing material or resins 14 suitable for use in this invention include, but are not limited to, resins and photo-initiators such as polyester/styrene resins, epoxys and acrylate resins, formulated for radiation curing by the methods described in, for instance, but not limited to, "Photinitiators for UV Curing—a Formulator's Guide," Document 97-102, Ciba-Geigy, October 1997, which is hereby incorporated by reference and "Cyracure Cycloaliphatic Epoxides: Cationic UV Cure," Document UC-958A, Union Carbide Corporation, 1997, which is hereby incorporated by reference.

Typical light-transmitting, lossy fibers 12 suitable for use in this invention include polymer, glass and quartz fibers made lossy by techniques such as, but not limited to, leakage by evanescent wave thorough suitably thin fiber-cladding or by bends in the fiber, including micro-bends introduced by weaving or by pressure or by gaps in the cladding made by etching or machining. Representative examples of these techniques for making fibers lossy is described in more detail below. Depending on the type of photo-resin being used and the wavelengths necessary to initiate the photo-curing resin setting reaction, different light-transmitting-and-leaking fibers may be more appropriate. For instance, typical glass and polymer fibers are capable of transmitting wavelengths of light down to about 350 nm, which is well into the 200–400 nm UV spectrum of greatest interest for UV photo-curing. Quartz or fused silica fiber optics are capable of transmitting wavelengths below 200 nm with little attenuation and are therefore capable of transmitting UV light across the entire spectrum of most interest for UV photo-curing.

FIG. 1 also shows a light source 16, capable of illuminating at least one end 20 of the light-transmitting-and-leaking fiber 12 by means of a collecting-and-focusing apparatus 18. Ideally collecting-and-focusing apparatus 18 transfers photons from light source 16 to fiber 12 in such a manner that the illuminating beam's numerical aperture closely matches the transmission numerical aperture of the fiber optic.

Suitable light sources 16 include, but are not limited to, well known photon sources such as light-emitting diodes (LEDs), fluorescent (black) lights, mercury lamps, xenon flash lamps, deuterium lamps, lasers, including but not limited to, gas and diode pumped blue and UV lasers, including the new generation of UV diode lasers under development with wavelengths in the range of 383 to 405 nm and powers approaching 20 mw.

Radiation from the light source 16 will have to be collected and focused by a suitable collecting and focusing apparatus 18 into the end 20, which may be polished or coated for optimum light acceptance, of the fiber 12 or bundle of fibers 12. The far end 26 may additionally be coated to reflect light back along fiber 12 so as to even the light leakage. Components suitable for use in the collecting and focusing apparatus 18 are well known and include a wide variety of lenses, mirrors and lens and mirror combinations, including lenses and mirrors with appropriate transmission and reflection coatings. For most efficient use of the light source 16, the numerical aperture of the collecting and focusing apparatus 16 should match the numerical aperture of the fiber optics. Typical focusing optics will have f numbers on the order of 1.5 to 2. Since the diameter of the fiber pigtails will be a few millimeters it is important to have a bright source of limited extent. For this situation a high brightness source such as a compact arc, deuterium lamp or short arc pulsed xenon lamp is preferred. These sources are preferred over diffuse sources with low brightness such as black lights. Mercury lamps can be used reasonably well with fiber optic bundles if the polished ends 20 are configured in a linear array. Lasers, with their precise wavelengths, high intensity, and high coupling efficiency into a fiber optic bundle would be the ideal choice. There are many well known blue and UV lasers that would work for photocuring sources.

Figure 2:
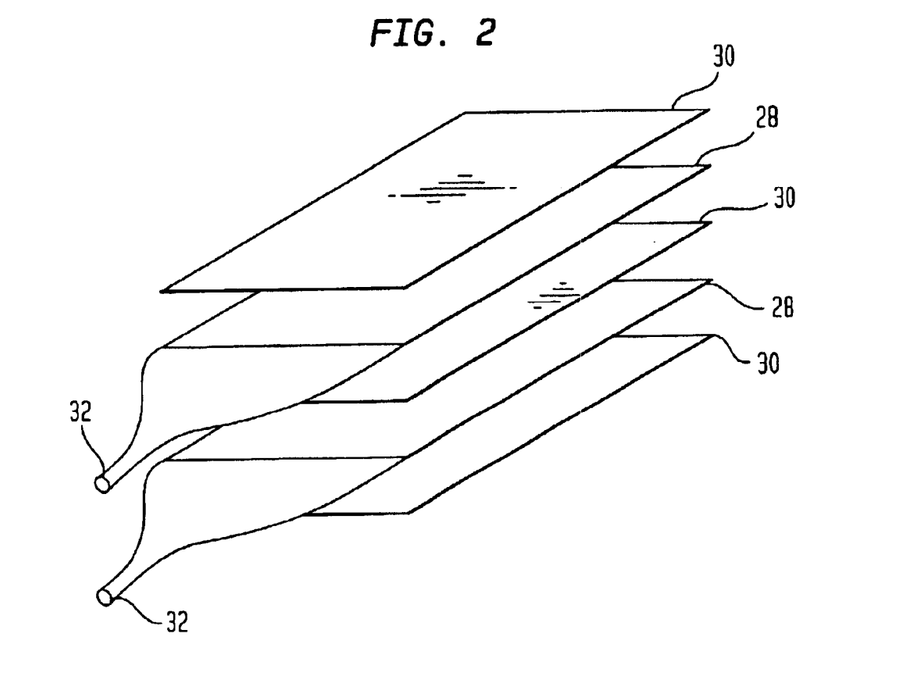
FIG. 2 is a perspective view of a sandwich layup composite material of this invention.

FIG. 2 is a perspective drawing of sandwich layup composite material embodiment of this invention. The sandwich layup includes one or more fiber optic mats 28, made in part of one or more light-transmitting, lossy fibers 12, interspersed between one or more reinforcing mats 30. The entire sandwich layup may be immersed in a suitable light curing resin 14 (not shown in FIG. 2), or one or both of the fiber optic mat 28 and reinforcing mat 30 may include a suitable light curing resin 14, as is common practice in the composite material industry in the form of prepreg fabric or material. The fiber optic mat 28 in FIG. 2 is gathered into a fiber optic pigtail 32 for connection to a suitable light source 16 (not shown in FIG. 2).

In another embodiment of the invention, the fiber optic mat 28 is made of radiation transmitting lossy fibers 12 constructed from materials suitable for transmitting and leaking UV radiation, such as, but not limited to, quartz or fused silica.

The reinforcing mat 30 or the entire sandwich structure of FIG. 2, may be part of a composite material. A composite material generally consist of fibers in a matrix of a separate material as described in detail by for instance Chou, T. W., in "Structure and Properties of Composites," Materials Sci. and Tech., Vol. 13, pp. 34–37, 1993, the contents of which are hereby incorporated by reference, and in "Materials usage, design and analysis," in *Composite Materials Handbook—MIL* 17, Technomic Publishing. p. 22–7 to 22–26, the contents of which are hereby incorporated by reference. The most common fibers used in composite materials are made of glass, carbon, or a polymer such as Kevlar and the matrix of a composite material is typically a thermo- or UV setting polymer such as a polyester or an epoxy.

Figure 3:
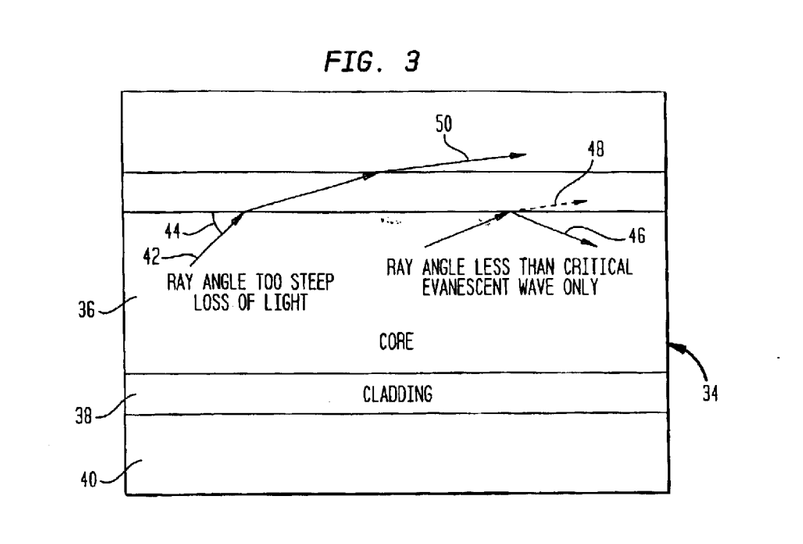
FIG. 3 is a cross-section of a fiber showing evanescent wave leakage.

FIG. 3 shows a cross section of a typical step index optical fiber 34 comprising a core 36, a cladding 38 and a protective sheath 40. As is well known, there are two generic types of fiber optics: step index or graded index. In both types the index of refraction of the material at the outer edge of the fiber is lower than that of the center. For the step index fiber 34 there is a core 36 and a cladding 38 with the cladding 38 having a lower index of refraction. In the case of the graded index fiber the index of refraction decreases gradually as you move toward the edge.

Both types of fibers are optionally sheathed in a protective layer 40, usually a polymer, to protect the fiber from abrasion, contamination, chemical attack, and undue strain. The material properties of any such fiber optic protective sheath 40 are an important consideration. The primary function of a sheath 40 is to protect the fiber surface from ambient water vapor, which adsorbs on the surface. The adsorbed water then reacts to form weak acids that etch the surface generating micro cracks that become failure points. In addition, the sheath keeps the surface of the fiber free of contamination and provides protection from abrasion. For the purposes of this invention, it is important that any sheath is made of a material, and in a manner, that allows the particular wavelength of electromagnetic radiation being leaked to cure the light-curable resin to be transmitted through it.

In particular, for the purposes of the embodiments of this invention in which the radiation-transmitting, lossy fibers 12 are made from materials suitable for transmitting UV radiation, if the lossy fiber 12 has a protective sheath 40, that sheath should preferably be made from one of the many suitable UV transmitting materials or polymers, so as to allow any UV light deliberately leaked past or through the cladding out of the fiber with little loss.

In one embodiment of the invention, the fiber optic protective sheath 40 is made from, or includes, a light curable resin, which may be, but is not limited to a blue or a UV curable resin.

Single mode fibers deliberately have tiny cores 36 and thick cladding 38 so that only a single mode can propagate. These fibers are used for communication due to their ability to carry high bandwidth information signals. Because of their small core, single mode fibers require extreme care in alignment when coupling light into or out of them. Large core 36 fibers are referred to as multimode fibers and these fibers are typically used when the application requires the transport of light energy. Multimode fibers are the most suitable for most embodiments of this invention.

Figure 4:
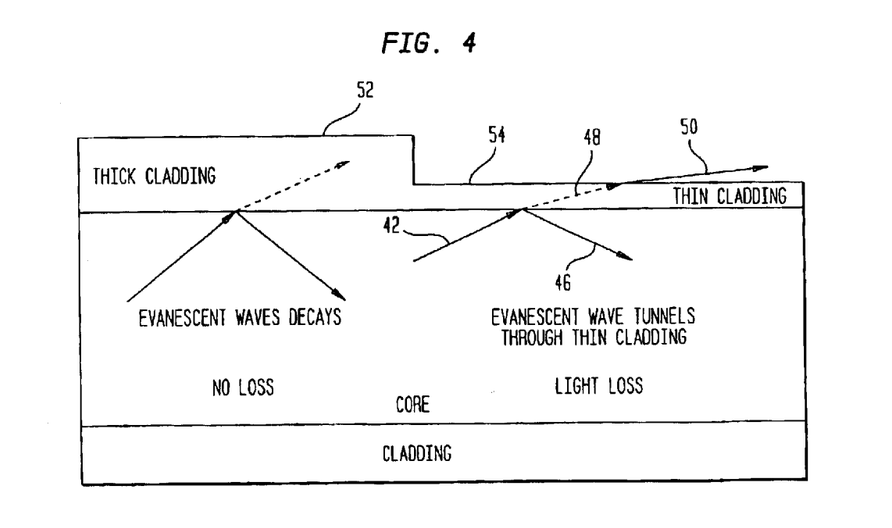
FIG. 4 is a cross-section of a fiber having thin and thick cladding.

FIG. 4 is a cross section of a step index optical fiber 34 of one embodiment of this invention, in which the cladding 38 has a thick cladding region 52 and a thin cladding region 54. The thin cladding region 54 is made sufficiently thin that the evanescent wave 48 is able to be transmitted as a transmitted ray 50. As can be calculated from Maxwell's well-known equations governing electromagnetic radiation, this thickness is of the order of the wavelength of the radiation being used.

Figure 5:
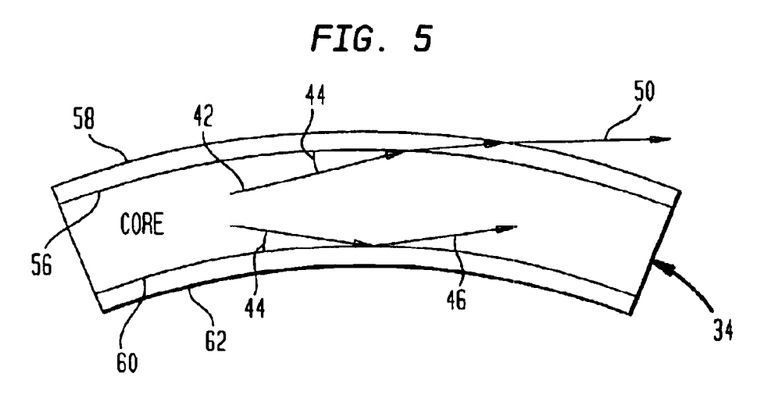
FIG. 5 is a cross-section showing a bend in a fiber causing leakage.

FIG. 5 is a cross section of a step index optical fiber 34 of one embodiment of this invention in which fiber 34 is bent so as to have an outer, concave, core-to-cladding transition 56, an outer, concave, cladding-to-external-media transition 58, an inner, convex, core-to-cladding transition 60 and an inner, convex, cladding-to-media transition 62. For rays have the same angle of propagation, introducing a bend effectively increases the angle of incidence 44 at the concave regions, allowing light to escape or leak out as a transmitted ray 50.

Figure 6:
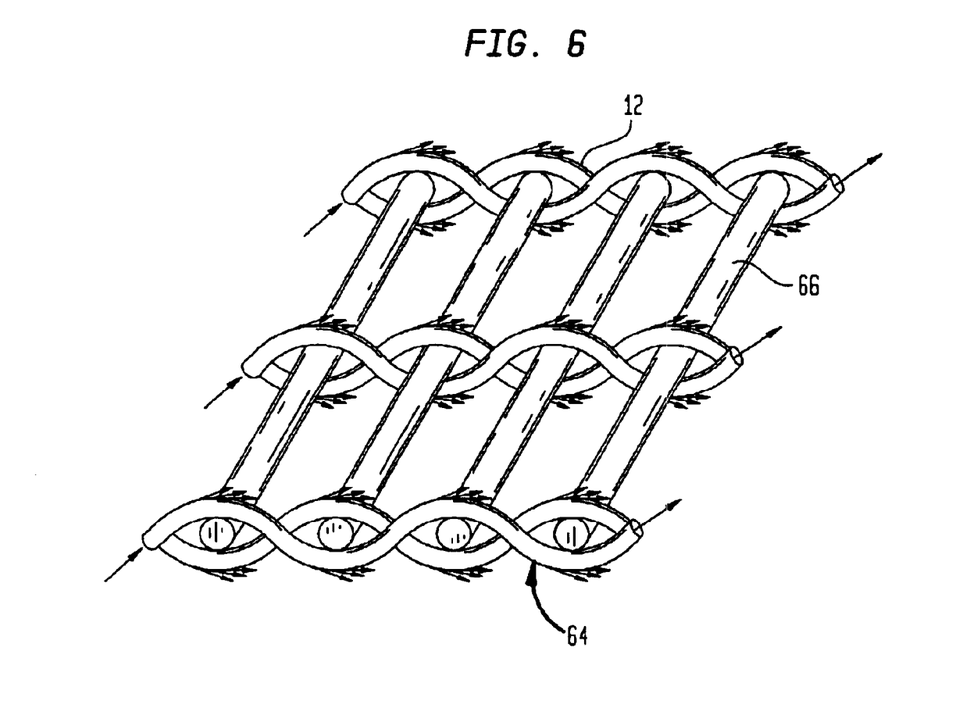
FIG. 6 is a perspective view showing a woven fiber mat leaking light at the micro-bends caused by the weaving.

FIG. 6 is a perspective drawing of a woven lossy fiber optic mat 64 of one embodiment of this invention, in which light-transmitting, lossy fibers 12 are woven in with stiff fibers 66 running substantially normal to the light-transmitting, lossy fibers 12. In a further embodiment of this invention, either the stiff fibers 66 or both the stiff fibers 66 and the lossy fibers 12 may be an integral, structural part of the device or bond formed.

Figure 7:
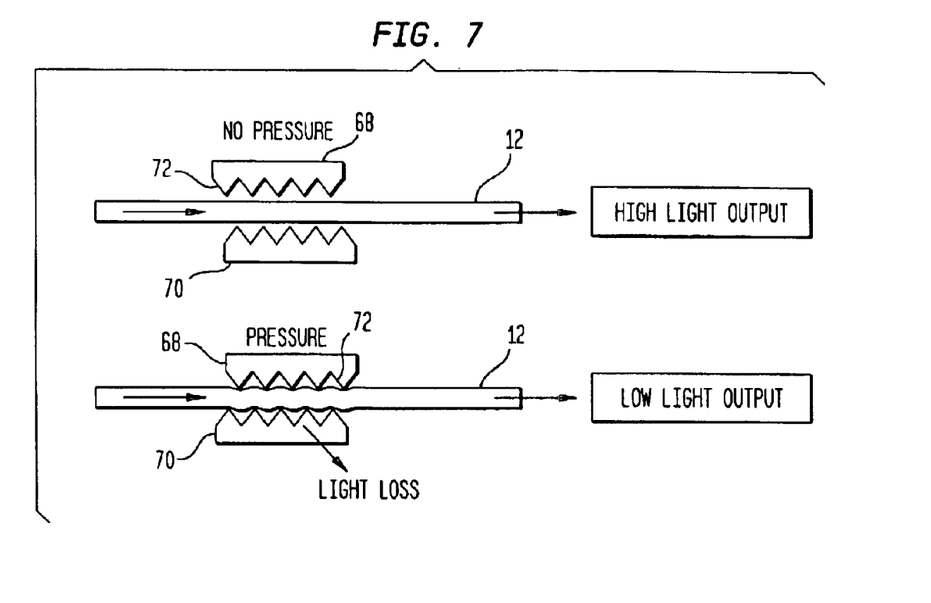
FIG. 7 is a cross-section showing the use of pressure to produce light leakage from a fiber.

FIG. 7a is a cross sectional drawing showing a light transmitting fiber 12 between a top half 68 and a bottom half 70 of a clamping device having interlocking teeth 72. FIG. 7b is a cross sectional drawing showing a lossy light transmitting fiber 12 facilitated by the micro-bends formed when the top half 68 and bottom half 70 of the clamping device are engaged to exert pressure on the light transmitting fiber 12 via their interlocking teeth 72. In one embodiment of this invention, the parts being bonded together may have tooth like structure 72 on the surface to be bonded that causes such light-leaking, micro-bends to be formed in the bonding optical fiber mat when placed on the mat with sufficient pressure.

Figure 8:
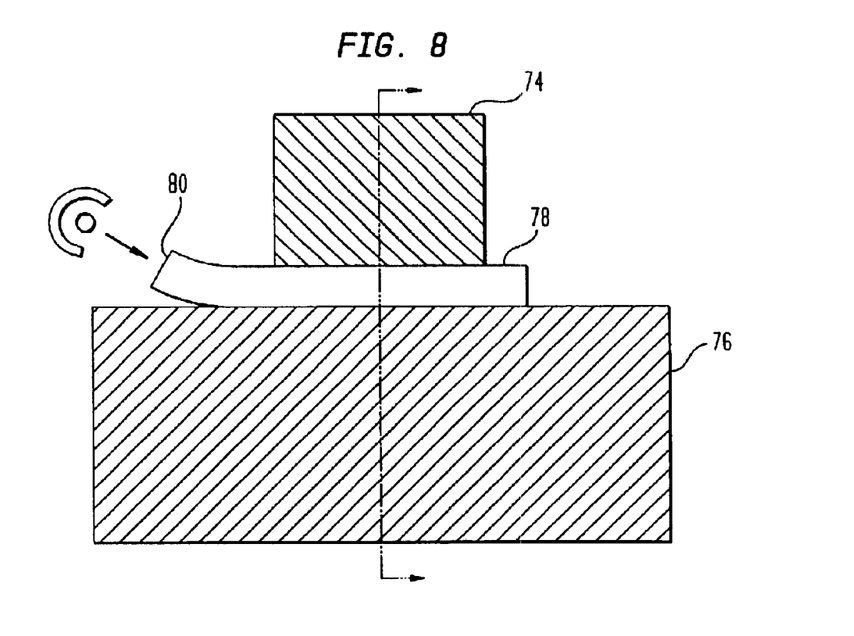
FIG. 8 is a longitudinal cross-section showing two objects being joined by a fiber-cured mat.

FIG. 8 is a longitudinal cross-section showing a top element 74 attached to a bottom element 76 by means of a bonding mat 78. FIG. 8 also shows a light source 16 and collecting and focusing apparatus 18 being used to illuminate one edge of the bonding mat 80. The top and bottom elements may be structures of any suitable material, including, but not limited to plastic, glass, ceramics, wood, cloth, metal, or specific metals or alloys, such as but not limited to aluminum, copper and steel.

Figure 9:
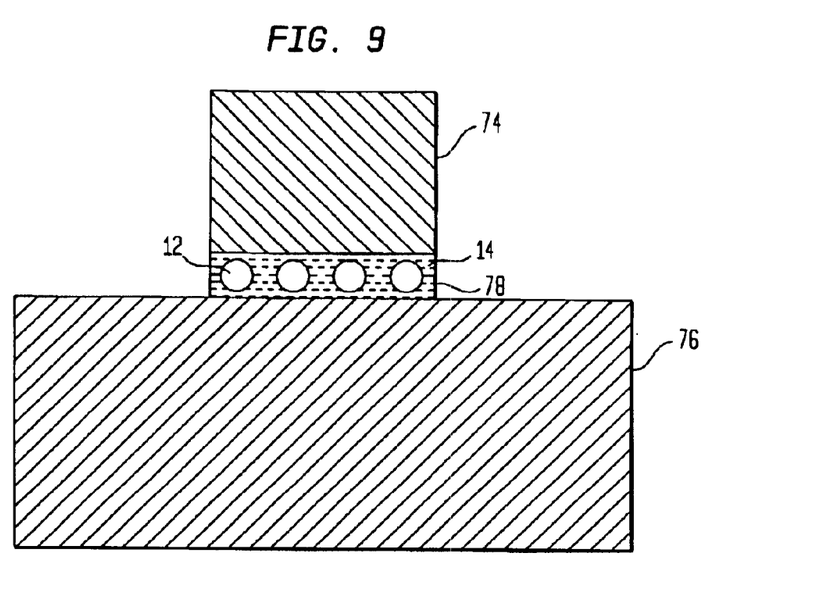
FIG. 9 is a transverse cross-section showing two objects being joined by a fiber-cured mat.

FIG. 9 is a transverse cross-section showing a further embodiment of the invention in which top element 74 attached to bottom element 76 by means of a light-leakingfiber, bonding mat 78. FIG. 9 also shows the bonding mat 78 including a plurality of light-transmitting, lossy fibers 12 embedded in a UV curing material or resin 14.

Figure 10:
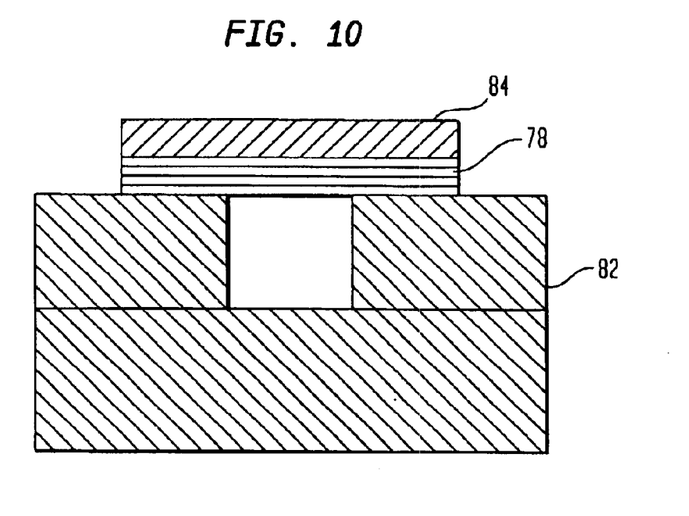
FIG. 10 is a cross section of a gap being bridged by a fiber cured mat.

FIG. 10 is a cross section showing a further embodiment of the invention in which a base material 82 and a bonding mat 78 bridging a gap in the base material 82. There may optionally also be a skin or cover material 84 serving as a top cover or additional structural piece.

In one embodiment the curing process of this invention is implemented as shown in FIG. 1. A UV light source 16 is connected to a lossy UV transmitting fiber optic 12 using a standard optical connection 18. The UV light source is turned on sending illumination substantially along the axis of the fiber 12, as indicated by light vector 22. At one or more points 24 along the fiber, UV light leaks out and is distributed to the UV curing material 14, initiating the polymerizing reaction. The part can be cured in minutes at which point the light source may be disconnected and any fixturing used to temporarily hold the part in the right shape or alignment may be removed.

In another embodiment of the invention, the composite material is used to form a part by for instance, but not limited to, a sandwich layup of interleaved reinforcing mats 30 and fiber optic mat 28 as shown in FIG. 2. In this embodiment a UV light source 16 (not shown in FIG. 2) is connected or coupled to the fiber optic pigtails 32, using a standard optical connection 18 (not shown in FIG. 2). When the UV light source 16 is turned on, UV illumination is sent through the lossy optical fibers 12 of the fiber optic mat 28. By this means, the UV light is distributed throughout the composite part initiating the polymerizing reaction that results in curing. Because the UV radiation is distributed directly throughout the material and is not attenuated by scattering and absorption before reaching the resin, the part can be cured in considerably less time than if the UV radiation was applied from outside the composite. The magnitude of this time saving can be seen from the following three examples of a thin, medium and thick layup.

For a thin 3 mm thick layaup, a fiber optic spacing of 2 mm necessitates two fiber mats separated by 2 mm lying 0.5 mm below the surface. Using a typical scale length for UV absorption in the resin of 1 mm, we can calculate curing times using the kinetic model of Kokubun et al. published in "Resin Selection and High-Speed Coating of Optical Fibers with UV Curable Materials," Journal of Lightwave Technology, Vol. 7, No. 5, pp. 824–828, the contents of which are hereby incorporated by reference, and related equations. For this thin layup the power required for the fiber optic layup is calculated to 1.5 times that of the planar illumination, indicating that planar curing is faster in this situation.

However, this changes dramatically once a medium layup of 6 mm thickness is considered. This would consist of three fiber optic sheets or mats with the two outer mates just 1 mm under the surface. Using the same methods, for this medium layup, the power required to cure the fiber optic layup is 0.008 times the planer illumination. This means that the method of this invention is estimated to require less than 1% of the power needed for a similar thickness composite cured by traditional UV methods.

For a 12 mm thick layup with a fiber spacing of 3 mm, the power ratio is close to one millionth. This is a very significant reduction.

Once the composite is cured, the light source may be disconnected, the fixturing (if any) can be removed, and the part can be trimmed and finished (the pigtails can be cut off).

Note that in the method of this invention, pressure can be applied to the outside surface of any patch being attached by composite material bonding by any suitable arrangement of fixtures, weights, or inflatable bladders. This is possible because, unlike conventional UV curing processes, there is no requirement to keep the area clear for external illumination sources.

The advantages of using the method and apparatus of this invention include, but are not limited to, rapid uniform curing for structures of arbitrary thickness, shape, fiber type, or fiber content, the ability to use UV curing resins with UV absorbing fibers, the operation requires less operator skill, special expensive equipment (e.g., an autoclave) and tooling is not required, the curing can be done over a large temperature range and the cure can be implemented at an end-use location.

As shown in FIG. 2, the method and apparatus of this invention uses optical fibers to deliver the photons in a distributed manner throughout the resin/fiber structure. In order to do this, the optical fibers need to be both distributed within the composite and they need to allow the light traveling through them to leak out over lengths characteristic of the mat dimensions. This leakage is obviously contrary to what fiber optic manufacturers have traditionally tried to achieve. Their goal has been to minimize light leakage.

There are several possible ways to modify the fiber optics to-allow light to leak out the sides as it propagates through the fiber. To describe them, it is useful to first review how a fiber optic transports light. Although the following discussion is, for simplicity, illustrated by means of reference to step index multimode fibers, one of skill in the art could readily adapt the concepts and ideas to any type of optical fiber.

As illustrated in FIG. 3, an optical fiber basically traps light propagating nearly along its axis by the phenomenon of total internal reflection that occurs when an incident light ray 42 grazes a surface of a medium, in this case the core 36, in contact with a medium, in this case the cladding 38, of lower index of refraction. In general, the light must be coupled into the fiber in such a manner that all the optical rays are confined to angles of incidence 44 less than the minimum for total internal reflection. When a reflected light ray 46 reflects from the surface, an "evanescent wave" 48 propagates into the low index medium, in this case the cladding 38, for a depth of a few wavelengths. This is shown schematically in FIG. 3. FIG. 3 also shows the case of an incident ray 42 whose angle of incidence 44 is greater than the maximum for total internal reflection to occur. The light escapes from the core 36 as shown by transmitted ray 50.

Most cladding layers 38 are many wavelengths thick. In FIG. 4 the situation is shown in which a region of thin cladding 52, is only a few wavelengths thick. In this case the evanescent wave 48 can emerge to propagate as a real, transmitted ray 50 outside the fiber. In this case, reflected light ray 46 will have less energy than incident light ray 42. Therefore, if the fiber cladding can be made thin enough a portion of the light will be lost from the fiber. When we are considering UV radiation in the range of 300 nm wavelength, this implies that a fiber would have to be manufactured with a cladding thickness of about 1 micron, which is easily achievable. Such a fiber would leak light by evanescent wave propagation along its entire length.

There are several other ways to produce a lossy fiber.

In another embodiment, there are intermittent light "holes" spaced along the fiber which allow UV to escape from the fiber. In one specific embodiment of this invention, there are 100 micron sized divots in the cladding spaced every 5. Such light "holes" may be made by, for instance, but not limited to, an etching or machining operation conducted in a dry environment. A UV transparent cladding patch may be added immediately afterwards.

In a further embodiment of the invention, loss from the fibers may be induced by creating a bend in the fibers as shown in FIG. 5. Curvature in the fiber allows incident light rays 42 striking the concave surface 56 to be at a higher angle of incidence 44, thereby allowing them to leak out as transmitted light rays 50. Smaller radii of curvature generate larger leak rates.

In one embodiment of the invention illustrated in FIG. 6, there are lossy fiber mats 610 produced by optical fibers 10 being woven around stiff fibers 612 running normal to the optical fibers 10. This produces regular bending in the fibers in alternating directions resulting in a uniform light leakage rate.

In another embodiment of the invention, although fiber mats 64 are produced by interweaving the lossy optical fibers 12 with structural fibers 66, the light loss from the fiber 10 may be, in part, by mechanisms other then the bending of the optical fibers 12 such as, but not limited to, evanescent wave transmission through thin cladding.

In another embodiment of the invention reflective mirrors are added at the end of the fibers to get more uniform distribution of light loss.

In another embodiment of the present invention, a single light-transmitting, leaky fiber is run back and forth to make the light loss more uniform. This light-transmitting, leaky fiber may be interwoven either with other light-transmitting, leaky fiber or with other structural fibers. Because there more light may be emitted from the light-transmitting, leaky fiber nearer to the source of illumination and less light at the far end, by doubling up the fiber by running it back and forth or putting a mirror on it would make the light loss to be more equal along the length.

In another embodiment (not shown) multiple light sources are used, i.e., light is feed into both ends of the fiber.

In another embodiment (not shown), the light-transmitting, leaky fiber is illuminated by side launch. Just as light can exit a bent fiber, light can enter it. By wrapping the optical fibers around a light source enough light may be feed into the fiber to affect curing.

In a further embodiment of the invention (not shown), the lossy optical fiber or the fiber optic mat is incorporated into either a supported or an unsupported film adhesive. The supported film adhesive can be designed with woven or unwoven scrims.

In these film adhesive embodiments, the light-transmitting, leaky fibers are typically coated with resin and placed between the parts to be bonded. In addition to providing the means for curing, the light-transmitting, leaky fibers can increase bond strength, maintain a minimum bond thickness to prevent all of the resin from being squeezed out when the parts are pressed together, and may also provide a path to allow trapped air to be removed from the bond area.

Light curable resins are often activated only or more efficiently by shorter wavelengths of light, such as, but not limited to those wavelengths conventionally described as either blue or UV light. For this reason much of the description of the invention has been in terms specific to blue light or UV light. However, one of skill in the art will readily appreciate that most aspects and described embodiments of the invention are operable with any wavelength of electromagnetic radiation for which there is both a radiation curable resin and fibers capable of transmitting and leaking that wavelength of electromagnetic radiation. In particular, suitable fibers and curable resins are readily available for visible wavelength (400–700 nm) photons, a near infrared wavelength (700–2000 nm) photons, mid wave IR (2–5 microns) photons and far IR wavelength (5–20 microns) photons. All heat curable resins could be curable using IR photons, with the reaction driven by heat rather than catalysis.

While the invention has been described in its preferred versions and embodiments with some degree of particularity, it is understood that this description has been given only by way of example and that numerous changes in the details of construction, fabrication, and use, including the combination and arrangement of parts, may be made without departing from the spirit and scope of the invention.

What is claimed is:

1. A curing apparatus, comprising:
   a light curable material, said material being capable of being cured by exposure to one or more specific wavelengths of electro-magnetic radiation; and
   one or more lossy optical fibers arranged in proximity to said curable material such that when one end of said fibers is illuminated with said electro-magnetic radiation,
   said curable material is cured by said electro-magnetic radiation leaked by said lossy optical fiber at one or more sites along the length of said fibers.

2. The curing apparatus of claim 1 further comprising a source of electro-magnetic radiation.

3. The curing apparatus of claim 2 wherein said source of electro-magnetic radiation is chosen from the group consisting of light emitting diodes, fluorescent lights, mercury lamps, xenon flash lamps, deuterium lamps, gas UV lasers and diode UV lasers.

4. The curing apparatus of claim 1 wherein said curable material is chosen from the group consisting of epoxy resins, polyester/styrene resins and acrylate resins.

5. The curing apparatus of claim 1 wherein said curable material is a composite structure.

6. The curing apparatus of claim 5 wherein said lossy optical fibers are embedded in said composite structure.

7. The curing apparatus of claim 1 wherein said electro-magnetic radiation is ultra-violet radiation with a wavelength less than or equal to 400 nm.

8. The curing apparatus of claim 7 wherein said ultra-violet radiation has a wavelength in the range 200 to 400 nm.

9. The curing apparatus of claim 1 wherein said electro-magnetic radiation is visible radiation with wavelengths in the range of 400 to 700 nm.

10. The curing apparatus of claim 1 wherein said electro-magnetic radiation is near infrared radiation with wavelengths in the range of 700–2000 nm.

11. The curing apparatus of claim 1 wherein said electro-magnetic radiation is mid wave infrared radiation with wavelengths in the range of 2–5 microns.

12. The curing apparatus of claim 1 wherein said electro-magnetic radiation is far infrared radiation with wavelengths in the range of 5–20 microns.

13. A curing apparatus, comprising:
    a light curable material, said material being capable of being cured by exposure to one or more specific wavelengths of electro-magnetic radiation; and
    one or more lossy optical fibers in proximity to said curable material such that when one end of said fibers is illuminated with said electro-magnetic radiation, said curable material is cured by said electro-magnetic radiation leaked from said light transmitting fiber as an evanescent wave.

14. The curing apparatus of claim 13 wherein said fibers have intermittently thin cladding, whereby said electro-magnetic radiation is leaked as said evanescent wave.

15. The curing apparatus of claim 13 wherein said fibers have continuously thin cladding, whereby said electro-magnetic radiation is leaked as said evanescent wave.

16. A curing apparatus, comprising:

a light curable material, said material being capable of being cured by exposure to one or more specific wavelengths of electro-magnetic radiation; and one or more lossy optical fibers in proximity to said curable material, said fibers including a plurality of light holes spaced along said fibers such that when one end of said fibers is illuminated with said electro-magnetic radiation, said curable material is cured by said electro-magnetic radiation leaked from said light transmitting fiber via said light holes.

17. The curing apparatus of claim 16 wherein said light holes are formed as divots in the cladding.

18. The curing apparatus of claim 17 wherein said divots are approximately 100 microns in width and are spaced at approximately 5 mm intervals.

19. A curing apparatus, comprising:

a light curable material, said material being capable of being cured by exposure to one or more specific wavelengths of electro-magnetic radiation; and one or more light transmitting fibers in proximity to said curable material, said fiber including one or more bent regions of said fiber such that when one end of said fibers is illuminated with said electro-magnetic radiation, said curable material is cured by said electro-magnetic radiation leaked from said light transmitting fiber via said bent regions.

20. The curing apparatus of claim 19 wherein said bent regions are formed by weaving said fibers.

21. The curing apparatus of claim 20 further including a fiber pigtail.

22. A curing apparatus, comprising:

a light curable material, said material being capable of being cured by exposure to one or more specific wavelengths of electro-magnetic radiation; and one or more light transmitting fibers in proximity to said curable material, said fiber including a protective sheath surrounding said fibers, wherein said protective sheath is a thin cladding of about 1 micron of a cured material substantially transparent to ultraviolet radiation obtained by exposing an ultraviolet radiation curable material to ultra-violet radiation.

23. A curing apparatus, comprising:

a light curable material, said material being capable of being cured by exposure to one or more specific wavelengths of electro-magnetic radiation;

a multiplicity of non-light transmitting fibers;

a multiplicity of lossy optical fibers, said lossy optical fibers being woven together with said non-light transmitting fibers to form a mat, said mat being placed in proximity to said curable material;

a source of said one or more specific wavelengths of electro-magnetic radiation, said source being capable of illuminating at least one end of said multiplicity of lossy optical fibers.

24. A curing method, comprising the steps of:

a) placing one or more lossy optical fibers near to a material, wherein said material is characterized by curing on exposure to electro-magnetic radiation;

b) illuminating at least one end of said lossy optical fibers with said electro-magnetic radiation;

c) curing said material by exposure to said electro-magnetic radiation leaked from said lossy optical fibers at one or more sights along the length of said fibers.

25. The method recited in claim 24, wherein said electro-magnetic radiation is leaked as an evanescent wave.

26. The method recited in claim 24, wherein said lossy optical fibers further include a plurality of light holes spaced along said lossy optical fibers, and wherein said electromagnetic radiation is leaked from said lossy optical fibers at said light holes.

27. The method recited in claim 24, wherein said lossy optical fibers further include one or more bent regions, and wherein said electromagnetic radiation is leaked from said lossy optical fibers at said one or more bent regions.

28. The method recited in claim 24, wherein said lossy optical fibers further include a protective sheath surrounding said fibers and wherein said protective sheath is made of said material capable of being cured by exposure to ultra-violet radiation.

29. The method recited in claim 24, further including the steps of providing a multiplicity of non-light transmitting fibers; weaving said lossy optical fibers together with said non-light transmitting fibers to form a mat; and placing said mat in proximity to said curable material.

* * * * *